United States Patent
Grady

(10) Patent No.: US 7,135,686 B1
(45) Date of Patent: Nov. 14, 2006

(54) LOW NOISE X-RAY DETECTOR FOR FLUOROSCOPY

(76) Inventor: John K. Grady, 323 W. Main St., Ayer, MA (US) 01432

( * ) Notice: Subject to any disclaimer, the term of this patent is extended or adjusted under 35 U.S.C. 154(b) by 284 days.

(21) Appl. No.: 10/718,385

(22) Filed: Nov. 19, 2003

Related U.S. Application Data

(60) Provisional application No. 60/427,695, filed on Nov. 19, 2002.

(51) Int. Cl.
*G01T 1/20* (2006.01)

(52) U.S. Cl. .............................. 250/370.11; 250/390.11

(58) Field of Classification Search .......... 250/370.09, 250/370.11, 370.13, 591, 366, 367
See application file for complete search history.

(56) References Cited

U.S. PATENT DOCUMENTS

| | | | |
|---|---|---|---|
| 4,142,101 A | | 2/1979 | Yin |
| 4,503,460 A | | 3/1985 | Sklebitz |
| 4,901,337 A | | 2/1990 | Fujimoto |
| 5,023,896 A | * | 6/1991 | Yokouchi et al. .......... 378/98.3 |
| 5,138,642 A | | 8/1992 | McCroskey et al. |
| 5,235,191 A | | 8/1993 | Miller |
| 5,377,253 A | | 12/1994 | Ifuku |
| 5,412,705 A | | 5/1995 | Snoeren et al. |
| 5,438,604 A | | 8/1995 | Horbaschek |
| 5,559,849 A | | 9/1996 | Bruijns |
| 5,574,284 A | * | 11/1996 | Farr ....................... 250/370.06 |
| 5,723,865 A | | 3/1998 | Trissel et al. |
| 5,864,146 A | | 1/1999 | Karellas |
| 5,878,107 A | | 3/1999 | Ishikawa et al. |
| 5,970,115 A | | 10/1999 | Colbeth et al. |

(Continued)

OTHER PUBLICATIONS

Marconi Applied Technologies Limited, "CCD65 Series Ceramic Pack, Low-light CCD Sensor", Mar. 2002.
Marconi Applied Technologies Limited, "Technical Paper, Low Light Level Solid State TV Imaging", Feb. 2000.
Marconi Applied Technologies Limited, "CCD60 Series Ceramic Pack, Front-faced, Low-light CCD Sensor", Jan. 2002.
Varian Medical Systems, Inc., Web site print out, "X-ray Products", 1999-2002.
Tubbs et al., "Diffraction-limited CCD imaging with faint reference stars", Mar. 2002.

*Primary Examiner*—David Porta
*Assistant Examiner*—Faye Boosalis
(74) *Attorney, Agent, or Firm*—Hollard & Bonzagni, P.C.; Donald S. Holland, Esq.

(57) ABSTRACT

A flat-panel, quantum-limited x-ray imager for fluoroscopy is configured for converting very low levels of x-rays into electrical signals suitable for standard processing by a computer into real-time images, and comprises a screen for converting x-rays into visible light, a very fast demagnification lens system/array positioned behind the screen and configured to provide quantum-limited performance, and an array of CCD image sensors optically coupled, via the lens system, to the screen. The CCD sensors have a high signal-to-noise ratio and an onboard CCD amplification mechanism in the form of an extended section of "gain" register between the normal serial register and the final detection node or output amplifier. The sensors' sequential, internal electrodes are controlled by way of a clocking scheme that produces a slight and well-controlled avalanche multiplication (a slight gain) at each stage in the gain register.

12 Claims, 1 Drawing Sheet

U.S. PATENT DOCUMENTS

| | | |
|---|---|---|
| 6,031,892 A | 2/2000 | Karellas |
| 6,151,382 A * | 11/2000 | Gilblom .................... 378/98.8 |
| 6,180,946 B1 * | 1/2001 | Ebstein ................. 250/370.11 |
| 6,192,105 B1 | 2/2001 | Hunter et al. |
| 6,215,848 B1 | 4/2001 | Linders et al. |
| 6,226,351 B1 | 5/2001 | Snoeren et al. |
| 6,314,160 B1 | 11/2001 | Dhawale et al. |
| 6,437,339 B1 * | 8/2002 | Lee et al. .............. 250/370.09 |
| 6,448,544 B1 * | 9/2002 | Stanton et al. ........... 250/208.1 |
| 6,496,309 B1 * | 12/2002 | Bliton et al. ................. 359/618 |
| 6,627,897 B1 * | 9/2003 | Francke et al. .......... 250/385.1 |
| 6,946,665 B1 * | 9/2005 | Muraki et al. ........... 250/492.1 |
| 2002/0070349 A1 * | 6/2002 | Hoyt ....................... 250/458.1 |

* cited by examiner

LOW NOISE X-RAY DETECTOR FOR FLUOROSCOPY

This application claims priority from a Provisional Application Ser. No. 60/427,695, filed Nov. 19, 2002.

FIELD

The present invention relates to devices for detecting and imaging x-rays.

BACKGROUND

Fluoroscopy is a process for obtaining continuous, real-time images of an interior area of a patient via the application and detection of penetrating x-rays. Put simply, x-rays are transmitted through the patient and converted into visible spectrum light by some sort of conversion mechanism (e.g., x-ray-to-light conversion screen and/or x-ray image intensifier). Subsequently, the visible light is captured by a video camera system (or similar device) and displayed on a monitor for use by a medical professional. Typically, this is done to examine some sort of ongoing biological process in the human body, e.g., the functioning of the lower digestive tract.

Currently, most fluoroscopy is done using x-ray image intensifiers. These are large, vacuum tube devices (i.e., akin to a CRT or conventional television) that typically receive the x-rays in an input end, convert the x-rays to light and then electron beams, guide, accelerate, and amplify the electron beams via internal electrodes, and convert the electron beams to a minified visible image at the device's output end. An example of an x-ray image intensifier is shown in U.S. Pat. No. 5,773,923 to Tamagawa (see FIGS. 1 and 2 and accompanying description).

Typically, directly viewing the output end of an x-ray image intensifier is difficult and/or undesirable. For example, x-ray image intensifiers usually have to be positioned where direct viewing of the intensifier output is physically difficult (e.g., on a positioning gantry above a patient). Furthermore, tube outputs are often times not optimized for direct viewing, and it may be necessary to record or process the image for enhanced viewing, archival purposes, or for image analysis. Accordingly, image intensifiers are oftentimes used in conjunction with television cameras with computer imaging systems that transfer the tube image to a television or computer monitor. An example of such a system is shown in U.S. Pat. No. 4,503,460 to Sklebitz.

While x-ray image intensifiers (alone or as part of a larger system) are well established and have proven very useful over the years, they have certain drawbacks. One of these is that the image intensifier tubes are necessarily quite bulky and heavy, e.g., like a television CRT. Accordingly, they are ill suited for applications where space and/or weight are an issue. Additionally, x-ray image intensifiers suffer from inherent temporal and spatial instability, poor contrast ratios, and pincushion distortions.

Numerous recent attempts have been made to replace vacuum tube image intensifiers with solid-state, "flat panel" x-ray detectors for "directly" converting x-rays into electronic signals suitable for computer processing and display. Such detectors usually comprise some sort of large-area, composite, semiconductor-based panel configured to detect x-rays that hit the panel. For example, a typical flat panel detector might include a layer of photoconductor for converting incident x-rays into electrical charge, and a very large area integrated circuit, itself comprising an array of field effect transistors interconnected with thin film transistor switches, for readout of the charge. Systems based on optical photodiodes in an array in contact with a scintillator are also known.

While such detectors are thin and easy to hold and position, they are not well suited for fluoroscopy. This is because they have an almost irresolvable noise problem at the very low x-ray dose rates required for fluoroscopy. More specifically, because fluoroscopy involves examining an ongoing biological process (as opposed to taking an x-ray "snapshot"), patients are subjected to an ongoing dosage which must be minimized. As such, only a small amount of x-rays can be applied, or patients would quickly be injured. This is a problem for existing flat panel detectors, because the millions of signal lines used to read the x-ray induced charge (i.e., to scan the pixels) are as long as the panel itself, which is typically 25–50 cm (10–20 in) long to provide a large enough viewing area (i.e., the panel has to have a large enough area to facilitate viewing of the area(s) of interest—typically, the same or similar size as conventional x-ray film). As such, these long lines have significant electrical capacity (on the order of picofarads) to other lines and to ground. This limits the detectable signal, as electrons forming the signal current will have to charge and discharge this parasitic capacitance. When the signal is only a few hundred electrons (as may be the case with low levels of x-rays), the voltage changes in the signal lines may only be in the order of microvolts, which are too low to be seen above the inherent input device thermal noise exhibited by all amplifiers. This inherent electrical noise gets worse with high speed readout (higher bandwidth), which is required for 30 frames-per-second ("fps") fluoroscopy. For example, for low numbers of x-ray photons (e.g., 10) per detector pixel, as needed for fluoroscopy, each x-ray photon results in a signal per pixel (as finally read out in a flat panel device) of around 600 electrons, meaning that image data is lost in the typically high noise levels of 2000–8000 electrons of the readout line amplifiers. Furthermore, because the manufacturing yields of such large-area (e.g., 900 cm$^2$) transistor arrays are typically quite small, existing flat panel detectors can be very expensive. Subdividing the panel readout may help, but that quadruples the already large number (1000's) of output amplifiers, since one is associated with each readout line.

Other x-ray detectors utilize optical systems and associated components as an alternative to oversized semiconductor panels. For example, in U.S. Pat. No. 5,723,865 to Trissel et al. ("Trissel"), a CCD camera (CCD sensor coupled to a lens system) is focused on the output surface of a special, composite x-ray conversion or scintillation screen, at the heart of which is a flat, single crystal of cesium iodide (CsI). In use, x-rays fall on the scintillation screen, and are converted into visible light, which is then picked up by the camera. However, because a single-crystal CsI screen and single CCD camera are used, the system in Trissel is only suitable for viewing small areas, e.g., as in a mammogram, its intended purpose.

U.S. Pat. No. 5,412,705 to Snoeren et al. ("Snoeren") shows another x-ray imaging device. Here, x-rays are applied to an object under examination, and are then converted into visible light by way of a special screen. The light from the screen is then focused by a lens system/array, the output of which is directed to an array of CCD (charge-coupled device) image sensors, which is operably connected to a computer or other electronic processing equipment for image reconstruction and/or display. This provides a wide viewing area without a large-area semiconductor panel.

However, the CCD sensors in Snoeren utilize weak-avalanche photodiodes for detecting incident light. These provide signal gain at each pixel, but also have disadvantageously-increased noise levels because of random fluctuations in the avalanche process, meaning that the detector is not well suited for very low levels of x-rays. Additionally, the lens system in Snoeren is not claimed as optimized for use with the low light levels associated with x-ray quantum limited imaging. Rather, Snoeren tries to improve the situation by causing more of the emitted light to be aimed toward the CCD array by a complex fluorescent screen fabrication using special optical techniques.

Accordingly, a primary object of the present invention is to provide a flat-panel x-ray detector or imager, suitable for use in fluoroscopy and other very low x-ray dosage applications, and that does not require the use of large-area semiconductor or integrated circuit arrays and associated long signal lines.

Another object of the present invention is to provide a system where every single, individual x-ray photon that interacts in the input screen produces an unambiguous signal in the output voltage. This is called "quantum limited" imaging, where x-ray statistics alone determine the noise level in the final image.

SUMMARY

A flat panel x-ray detector or imager for fluoroscopy is configured for converting very low levels of x-rays into electrical signals suitable for standard processing by a computer into real-time images, and comprises an x-ray conversion screen for converting x-rays into visible light, a very fast and carefully proportioned demagnification lens system/array positioned behind the screen, and an array of CCD image sensors, each with a predictable on-chip gain mechanism, optically coupled, via the lens system, to the screen. The demagnification ratio of the lens system, as well as the axial spacing between the components, are selected to provide quantum-limited performance based on system geometry, lens type and speed, type of screen, and CCD noise/detection efficiency.

The CCD sensors, which may be members of the L3Vision™ range of image sensors available from Marconi Applied Technologies, have a high signal-to-noise ratio. To minimize the aforementioned readout noise, the CCD sensors have an onboard CCD amplification mechanism, wherein the image, store, and read-out registers of the CCD sensor are of conventional design, but there is an extended section of "gain" register between the normal serial register and the final detection node or output amplifier. The sensors' sequential, internal electrodes are controlled by way of a clocking scheme that produces a slight and well-controlled avalanche multiplication (a slight gain) at each stage in the gain register. (This is in contrast to having avalanche photodiodes at each pixel site, which is a noisy and random process where the gain obtained can vary.) Although the mean gain per shift register gain stage is small, over the large number of stages of a typical read-out register the total gain can be quite high, and quite consistent due to inherent averaging processes.

In use, a standard x-ray source is employed to apply low levels of x-rays to a patient for fluoroscopy. The patient is appropriately positioned (for viewing the feature(s) of interest) in front of the x-ray conversion screen, with the x-ray source, patient, and screen sharing a common axis. The x-rays hit the screen, and are converted into visible light. As should be appreciated, because of the low levels of x-rays, there is relatively little light produced by the screen (about 1000 light photons per x-ray photon scintillation). This light passes through the lens system (which is designed to be quantum-limited at low light levels), and is demagnified onto the array of CCD sensors. The sensor pixels are capable in this design of detecting these very small amounts of light, from say a single x-ray scintillation, and generate electrical signals representing the sensed light. These electrical signals are then processed by a computer, appropriately electrically attached to the CCD sensor outputs, for correction, alignment, and display on a monitor.

DETAILED DESCRIPTION

Figure 1:
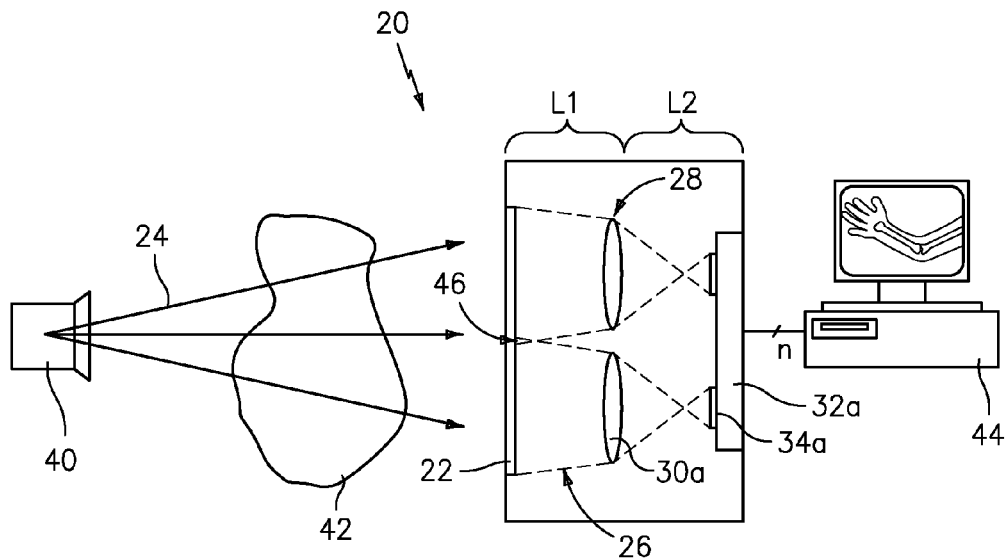
FIG. 1 is a schematic view of a low noise x-ray detector for fluoroscopy in use with associated equipment.
Figure 2:
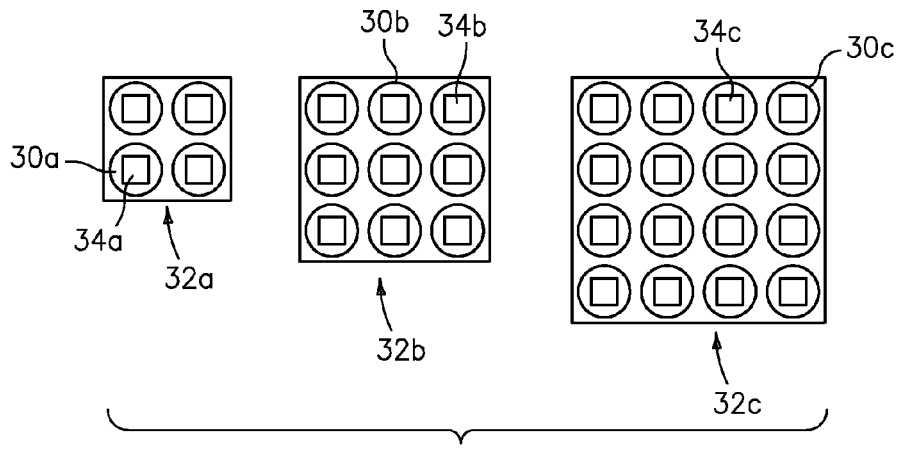
FIG. 2 is a schematic plan view of various arrays of low-noise CCD sensors for use in the low noise x-ray detector for fluoroscopy.
Figure 3:
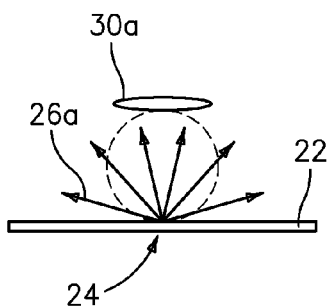
FIG. 3 is a conceptual view of an x-ray interacting with an x-ray conversion screen to produce visible light.

FIGS. 1–3 illustrate a preferred embodiment of the present invention. The invention is a flat panel, quantum-noise-limited x-ray detector or imager 20 ("imager") for fluoroscopy. The imager 20: (i) can be provided in a "flat-screen" (i.e., thin, low profile, non-bulky) format; (ii) works at speeds suitable for fluoroscopy (e.g., 30 fps); (iii) converts very low levels of x-rays into electrical signals suitable for standard processing by a computer into real-time images; and (iv) operates in a quantum-limited way, down to the lowest useable fluoro x-ray dose rate, unlike existing "flat panel" detectors.

With reference to FIG. 1, the preferred imager 20 includes a cesium-iodide (CsI) screen 22, which is about 600 □m thick, for converting x-rays (e.g., 24) into photons (visible light) e.g. 26. The screen has a high DQE (detective quantum efficiency) for x-rays, typically above 0.6. (The DQE is the measure of the combined effect of the noise and contrast performance of an x-ray imaging system, in essence a measure of information transfer, resulting in a scale of 0 to 1, with 1 indicating no loss.) Additionally, a very fast (e.g., around f.65) demagnification lens system/array 28 is positioned behind the CsI screen 22 and comprises a number of individual lenses (e.g. 30a, 30b, 30c). The lenses may be aspheric. The demagnification ratio of the lens system is a variable which is set within certain limits, depending on the particular geometry of the system (among other factors), to obtain quantum-limited performance, namely, performance where the limiting factor becomes x-ray quantum noise, which is attributable to the discrete and probabilistic nature of physical x-ray phenomena and their interactions.

Additionally, an array (e.g., 32a, 32b, 32c) of four, nine, or sixteen CCD (charge-coupled device) image sensors (e.g., 34a, 34b, 34c) are optically coupled, via the lens system 28, to the CsI screen 22. The CCD sensors: (i) operate at low noise levels and high signal-to-noise ratios due to on-chip gain mechanisms (and, therefore, are capable of detecting very small amounts of light); (ii) may, at option, be cooled to further reduce noise; and (iii) have an onboard CCD gain section that acts as a charge amplifier for boosting signal levels before a standard output stage. The individual photosensitive elements (e.g., photodiodes) of the CCD sensors themselves (pixels) are not configured for avalanche charge multiplication, due to the additive noise issues such an approach causes, with consequential reduction in system DQE.

The CCD sensors may be members of the L3Vision™ range of image sensors (e.g., model nos. CCD60 or CCD65) available from Marconi Applied Technologies (now "e2v technologies"), 106 Waterhouse Lane, Chelmsford, Essex CM1 2QU, England (see http://e2vtechnologies.com); also, 4 Westchester Plaza, Elmsford, N.Y. 10523-1482. The sensors may be from 14 mm to 25 mm or more in diagonal diameter of active imaging area. Further characteristics of these sensors are given below. See also U.S. Pat. No. 6,444,968.

In the lens system, there is one lens (e.g. 30a) per CCD sensor (e.g., 34a). Thus, a four sensor array 32c will have four lenses in the lens system 28. Additionally, length L1 (distance from lens to screen) and length L2 (distance from lens to CCD sensor) will vary from system to system, but are chosen (taking into account the particular geometry, lens types, screen, etc., of the particular system) to provide quantum-limited operation. In conjunction with the preselected lengths L1 and L2, the lens system has an optimized demagnification ratio, such that the lens system: (i) is quantum-limited in operation with the described CCD operating mode; and (ii) can transfer very low levels of light (at least 1 to 10+ light photons per x-ray photon detected at the CsI screen) from the CsI screen 22 to each CCD pixel. In other words, the lens system is able to transfer a sample of the light it receives from the CsI screen (even down to levels of tens of light photons per x-ray photon detected at the CsI screen) to the CCD pixels such that x-ray image information is not lost. Actual levels may ideally be somewhat higher, in order to avoid statistical intensity variation, another source of additive noise. More specifically, for every x-ray scintillation in the CsI screen, the lens system will ideally collect and transfer at least a certain number (e.g., in the 10's) of the light photons generated by the CsI screen (per CCD pixel, and as a function of time, per image).

In use, a standard x-ray source 40 is employed to apply low levels of x-rays (i.e., levels suitable for fluoroscopy) to a patient 42. The patient is appropriately positioned (for viewing the feature(s) of interest) in front of the CsI screen 22, with the x-ray source, patient, and CsI screen sharing a common axis. The x-rays hit the CsI screen 22, and a portion are converted into visible light (e.g. 26) As should be appreciated, because of the low levels of x-rays, there is relatively little light produced by the CsI screen (about 1000 light photons per x-ray photon scintillation). This light passes through the lens system 28 (which is specially configured for low light levels), and is demagnified onto the array 30a, 30b, or 30c of CCD sensors (e.g. 34a, 34b, 34c). The sensor pixels 32 are capable of detecting these very small amounts of light, and generate electrical signals representing the sensed light. These signals or charge packets are first amplified on the CCD chip by the gain register, and are then passed to the output amplifier. Due to significant amplification in the special shift register, the signal (i.e., an amplified detection signal) is now larger than the output amplifier input noise. The output signals are then processed by a computer 44, appropriately electrically attached to the CCD sensor outputs, for correction, merging, alignment, and display on a monitor.

Note that there is a slight overlap (area 46 on FIG. 1) of inscribed CCD squares on the CsI screen 22. More specifically, there are 10–15 "lines" of 256 or 512 line scan overlap ($\approx$500 µm). Special circuitry or software in the computer may be provided for shifting each CCD image, aligning them, and averaging any overlapping pixels. To align the overlap, the system may be calibrated using a test pattern.

In order to achieve quantum-limited operation, for the lens system 28, the demagnification ratio and lens speed are appropriately selected/calculated, again, taking into account the particular geometry, lens types, screen, etc. To elaborate (in a simplified sense), each 70 KeV x-ray "interaction" or scintillation in a CsI screen results in about 1000 light photons emitted in a semi-Lambertian pattern, as roughly shown in FIG. 3. Essentially, the pattern can be conceptually thought of as a sphere with tangent centered on the event (point of x-ray impact) and the lens system 28. The lens physical diameter intercepts maybe 10–20 photons per event in a real-world system. To remedy this, by having less demagnification (a smaller view area), the lens can be moved closer to the screen for catching more of the photons, requiring more CCD's and lenses. However, the "acceptance angle" of the lens is generally fixed (e.g., light cannot be bent at 90 degrees and focused), so there is a significant tradeoff. It is the intent of this system to use as few lenses as possible, while maintaining essentially all information presented by the x-ray screen (quantum limited).

It should be noted that various known ways are available to beneficially modify the emitted pattern. For example, the CsI crystals can be grown with a column-like pattern in the crystals, which tends to cause the emitted light to be more concentrated in a direction normal to the screen, with a reflective surface on the opposite, x-ray side. Another approach is an array of micro-lenses (similar to, but the inverse of, the Sony® "HYPER-HAD" used in television cameras). Such a micro-lens array in contact with the screen tends to collimate the light at the screen; improvements of a factor of three are quoted in the literature of television camera designs. Also, Fresnel-type gratings can be used, as can special screen configurations, such as those shown in the Snoeren patent. However, none of these are necessary for quantum-limited operation using the methods described herein.

The problem of capturing generated photons is also found in trying to photograph an x-ray screen. If the recording film (or, by analogy, the CCD) is not "marked" for every x-ray scintillation event, data is lost, requiring more x-ray quanta to expose the film properly, and more patient dose. This lossy process is suitable for imaging non-living items, such as luggage, since the x-ray dose can be significantly increased, but does not work for living patients, where each x-ray photon should contribute to the final image.

Previously, in attempting to solve these problems, various CCD sensors were overlapped in the prior art, with the resulting image signals being assembled with a computer frame buffer. However, this was only suitable for high x-ray/light levels, since CCD electrical "noise" during normal operation without a gain register configuration causes masking of low-light (10 or 20 light photon) signals. Thus, the CCD sensors used in the prior art had to be cooled to liquid nitrogen levels (as is done in astronomy) to reduce various noises, if one were to attempt x-ray quantum limited operation; such $LN_2$ cooling is impractical in an x-ray room (storage, frost, sealing, etc.) This is also one of the problems associated with current "flat plate" x-ray detectors, which have an almost irresolvable electrical noise problem at very low x-ray dose rates. As discussed previously, such detectors have millions of signal lines used to read the plate pixels that are as long as the plate itself (10" to 20" for an x-ray). These long lines have significant levels of parasitic capacitance to other lines and to ground. Such capacitances limit the detectable signal, as electrons forming the signal current have to charge and discharge the parasitic capacitance. Thus, when the signal is only a few hundred electrons per x-ray event (e.g., as is the case for low levels of x-ray dosage), the voltage changes per x-ray event on the capacitive lines may only be microvolts in size, which are too low to be seen in the inherent thermal noise found in all amplifiers. This noise gets worse with high speed readout, which is needed for 30 fps fluoroscopy. As a result, the DQE of existing flat-panel detectors is "input dose rate dependent," falling off quickly below about 1.5 μR (micro-roentgens) per image; yet 1.5 μR is still a usable fluoroscopic image.

The present invention, on the other hand, utilizes very low noise image sensors (e.g., Marconi L3Vision™ sensors). The sensors have a CCD transfer efficiency slightly above "1," so the signal representing even one x-ray photon grows as it is transferred across the chip, keeping it strong and above noise processes. The sensors are capable of detecting very low levels of light photons per pixel, namely, 1–10 photons per pixel, with moderate cooling (e.g., –10 to –20° C.), which may be beyond what is needed. This is in contrast to having avalanche photodiodes at each pixel site, as in the Snoeren patent. Although avalanche photodiodes were used in the prior art to raise the signal at each pixel, they are inherently noisy in and of themselves (CCD transfer and amplifier noise is also present), and avalanche diodes involve a random process wherein the gain obtained will vary spatially and temporally at each avalanche photodiode, again causing a dose-dependent DQE.

More specifically, while the Snoeren patent is superficially similar to the present invention, it depends on weak avalanching within the photodiode at each pixel location in an attempt to improve sensitivity and thus address this inherent noise problem. The problem with this is that each avalanche is statistically independent, so while gains of 1–10× are achieved, the gain variation both temporally and spatially causes an added noise indistinguishable from the real x-ray statistical variation (see column 4, lines 5–10 in Snoeren). In fact, this noise, described by Snoeren, is the problem the present invention addresses. According to the present invention, the CCD sensors (e.g., 34, 34b, 34c) do not use any avalanche photodiode multiplication at the individual pixels. Rather, an extremely small avalanche gain occurs many times (multiplicative) in a special register as a consequence of the way the CCD's are clocked. This results in a rather steady average gain factor, such that individual light photons may be discernable in the output signal. Such a mode of operation allows x-ray quantum limited fluoroscopy in the lowest usable x-ray flux levels, which is not found in the Snoeren patent due to the noisy avalanche photodiode CCD's used therein. In fact, Snoeren discusses the noise problem as a tradeoff in the patent text.

For low-light detection, the CCD sensors (e.g., 34, 34b, 34c) used in the present invention have a high signal-to-noise ratio (i.e., they operate at low net noise levels). To minimize noise, inverted-mode operation is used to reduce dark current noise, and back illumination may be utilized as well. More significant, however, is an onboard CCD amplification mechanism, as found on the Marconi L3Vision™ sensors. Specifically, the image, store, and read-out registers of the CCD sensor are of conventional design, but there is an extended section of "gain" register between the normal serial register and the final detection node, or output amplifier. Two of the phases are clocked with normal amplitude drive pulses (typically 10 volts), whereas the drive pulses of the third phase are of a much higher amplitude (e.g., 40–50 V). Before each third phase electrode is another electrode held at a low d.c. voltage (e.g., 2 V). The large potential difference between the low voltage electrodes and the high voltage electrodes gives rise to a high electric field in the underlying silicon such that electrons transferred to the third phase electrodes during the normal clocking sequence can experience slight and well-controlled avalanche multiplication, which thereby increases the number of electrons in the charge pocket, i.e., produces gain. Although the mean gain per stage is small, typically about 0.01 (to help avoid avalanche variation), over the large number of stages of a typical read-out register the total gain can be quite high, and also settable by the user. This strong signal is passed on to a conventional CCD output amplifier. However, the noise of the amplifier is now divided by the gain factor of the multiplication register, which will reduce the effective output read noise per light photon, so the signal-to-noise ratio is improved.

Due to the limited range of the optical demagnification ratio set by the need to detect every x-ray event, an array of CCD sensors is required for having a practically-sized (large) CsI screen. More specifically, in clinical use, the x-ray receptor (screen or film) has to be large enough for the area of interest (e.g., 25+ cm on the diagonal, at least). Given a set CCD sensor imaging area (e.g., 14 mm diagonal on the Marconi CCD65 sensor) and a set demagnification ratio for quantum-limited operation, a number of CCD sensors have to be provided to "cover" the entire screen. For example (not a real system), a demagnification ratio of 0.4 and a 14 mm diagonal sensor translates to 35 mm (on the diagonal) of CsI screen (35 mm=(14 mm/0.4)). An array of sixteen CCD sensors would allow for a 14 cm diagonal screen (four sensors on the diagonal=35 mm coverage/sensor×4 sensors). The actual number of CCD sensors required for a particularly-sized screen will depend on the exact demagnification ratio, optical design, and screen design of the system.

If moderate cooling is needed (as opposed to using liquid nitrogen), the CCD sensors may be enclosed in a thermally-insulated, gas-sealed enclosure that is cooled by a heat removal system, e.g., an external heat rejection or refrigeration system, or fins or cooling fluid that can remove heat from the sealed box. There are many well-known ways to accomplish this.

The preferred lens system 28 will now be discussed in further detail.

First, as mentioned above, the required image output size, the size of the active imaging area of the CCD sensors, and the number of CCD sensors used will interdependently determine the required demagnification ratio for the lenses 30 in the lens system 28. This relationship is given by:

$$m = (n \cdot d)/L_{Image}$$

where n=number of sensors per side (i.e., n=2 for a 2×2 array, n=3 for a 3×3 array), d=length of active imaging area per individual sensor, and $L_{Image}$=length of resultant image. Thus, for a sensor length d=11.52 mm (as is the case with certain of the Marconi CCD sensors) and a 3×3 array of sensors, a resultant image with a length of, say, 8 inches, would require a magnification ratio of m=0.17 (demagnification=5.88).

Other interrelationships to take into account are those between magnification ratio m, lens focal length f and distance $L_1$ from the lenses to the CsI screen. Based on standard lens optics equations, these are given by:

$$L_1 = f \cdot (1 + 1/m)$$

$$f = L_1 \cdot (m/(1+m))$$

$$m = f/(L_1 - f)$$

As should be appreciated, once the particular magnification ratio m is known, there is a fixed ratio between the focal length f and distance $L_1$.

From here, it is possible to mathematically calculate how x-rays and light photons are channeled through the imaging system. First, radiation from the x-ray source 40 is directed through the patient 42. A significant portion (typically from 99% to 99.9%) of this "raw" x-ray dosage is absorbed by the patient. The rest passes through and exits the patient. As such, the number of x-ray photons 24 arriving at the input of the CsI screen 22 as a function of area and time is given by multiplying the particular radiation dosage exiting the patient ("Exposure"), in terms of roentgens R per second, by the number of photons per roentgen produced by the x-ray source 40 ("ΦSpectrum"), in terms of area. This can be expressed as follows:

---

$\text{Flux}_{screen\ input} = \text{Exposure} \cdot \Phi\text{Spectrum}$, where
ΦSpectrum ≅ 2 · 10$^8$ (x-ray photons/mm$^2$)/R   (typical value for 80 kV)
Exposure = 80 μR/sec   (typical dosage for fluoroscopy)

---

Using these values, this results in a $\text{Flux}_{screen\ input}=1.6 \cdot 10^4$ (x-ray photons/mm$^2$)/sec received at the input of the CsI screen 22. Since image output from the CCD sensors is taken in terms of fps (i.e., 30 fps for fluoroscopy), this value can be converted into:

$$\text{Flux}_{screen\ input}=533(\text{x-ray photons/mm}^2)/\text{frame}$$

Since the number of x-ray photons arriving at the screen does not directly equal the number of x-ray "events" (scintillations or interactions that produce light photons) in the CsI screen, the events are calculated by multiplying the x-rays photons arriving at the screen ($\text{Flux}_{screen\ input}$) by the CsI screen's quantum detective efficiency QDE:

$$\text{Events (in }CsI\text{ screen)}=\text{Flux}_{screen\ input}\cdot QDE(\text{events/mm}^2)/\text{frame}$$

For a QDE=0.8 (a typical value), there will be around 427 (events/mm$^2$)/frame in the CsI screen.

As mentioned above, there will be a certain number of light photons emitted into the forward hemisphere of the screen (output side) per x-ray photon "event" in the CsI screen ("light photons per event"). Based on this, the light photon output of the CsI screen ("$CsI_{output}$") is given as:

$$CsI_{output}=(\text{light photons per event})\cdot(\text{events in }CsI\text{ screen) (photons/mm}^2)/\text{frame}$$

For a value of 1000 light photons produced per event (as above), $CsI_{output}=4.27 \cdot 10^5$ (photons/mm$^2$)/frame.

The next step is to calculate the "collection efficiency" ("CE") of the lens system, which is deemed to be that fraction of light photons emitted by the CsI screen that actually enters the lens system. Assuming a Lambertian or semi-Lambertian distribution (see above), and a given lens f-number $F_{num}$, the collection efficiency is given by:

$$CE=[1+4 \cdot F_{num}^2 \cdot (1+(1/m))^2]^{-1}$$

This equation was derived by expressing the lens collection efficiency for a Lambertian distribution (CE=sin$^2$ □) in terms of magnification m and lens f-number $F_{num}$, where □ is the polar angle subtended by the lens as measured from the axial point on the CsI screen (point on the cylindrical axis of the lens). It should be noted that an f-number of $F_{num}=0$, which indicates a theoretical infinite aperture, would result in a CE=1 (i.e., intuitively, since the aperture is infinite, all light is drawn into the lens, resulting in a perfect collection efficiency).

As an example, given a magnification ratio of m=0.25 (a representative value for producing a suitably-sized final image with a 3×3 CCD array) and a lens f-number of $F_{num}=0.7$ (representing a "fast" lens), the collection efficiency would be CE=0.02 (i.e., given these sample values, the lens system would collect 2% of the light emitted by the CsI screen).

Continuing on, the number of light photons incident on the CCD sensors ("$L_{ccd}$"), in terms of area and time, is proportional to the collection efficiency ("CE") divided by m$^2$, to account for the concentration of light because of demagnification. This can be expressed as:

$$L_{ccd}=[CsI_{output} \cdot CE \cdot (\text{LensTransmission})]/m^2$$

Here, "LensTransmission" is a factor relating to how much of the light entering into the lens is actually passed through it. Using the sample values given above (CE=0.2, m=0.25, $CsI_{output}=4.27 \cdot 10^5$ (photons/mm$^2$)/frame), and a LensTransmission=0.95 (a typical value), the light photons incident on the CCD sensors would be calculated as being $L^{ccd}=1.30 \cdot 10^5$ (photons/mm$^2$)/frame.

To determine the number of light photons arriving at each CCD pixel per frame ("$N_{ppf}$"), the following is used:

$$N_{ppf}=L_{ccd} \cdot (\text{area of each }CCD\text{ pixel}) \cdot (\text{fill factor})$$

Here, the "fill factor" is a proportionality constant relating to what percentage of the CCD image area is actually light sensitive. Thus, for the example value given above of $L^{ccd}=1.3 \cdot 10^5$ (photons/mm$^2$)/frame, a fill factor of about 1, and a pixel area of $6 \cdot 10^{-4}$ mm$^2$ (i.e., 20 microns by 30 microns, which are the dimensions of the CCD pixels in some of the Marconi CCD sensors), this would be calculated as:

$$N_{ppf}=77.82 \text{ (photons/pixel)/frame, or 2334.60 (photons/pixel)/sec}$$

As should be appreciated, this level of CCD light photon exposure (with a 3×3 lens/CCD array, magnification=0.25, and relatively fast lenses) provides a suitably-sized final image as well as a large enough number of light photons falling on the CCD pixels for quantum-limited operation ("tens" of light photons per CCD pixel).

To summarize:

$$N_{ppf}=k \cdot 1/[m^2+4 \cdot F_{num}^2 \cdot (1+m)^2]\text{, where}$$

$k$=Exposure·ΦSpectrum·(screen QDE)·(light photons per event)·(LensTransmission)·(area of each CCD pixel)·(fill factor)

Here is another example, using the 625-line Marconi CCD65 sensor:
active imaging area=11.52 mm×8.64 mm, with a horizontal dimension of 14.4 mm;
4×4 matrix (arbitrary);
resulting image size (on the diagonal): at least 8 inches.

Using $m=(n \cdot d)/L_{Image}=>m=0.28$

Using $L_1=f(1+1/m)=>L_1=4.52f$

From here, it would be possible to determine $L_1$ and/or f based upon how compact the system needs to be (i.e., maximum $L_1$) and the types of lenses that are available (focal length f is a function of lens material and geometry, while lens f-number is a function of lens focal length and lens diameter). For example, using a lens with f=28 mm would result in $L_1$=6.2 inches. Then, the lens f-number could be determined based on the focal length and other geometrical and material-related factors, and by using the lens collection efficiency equation given above, to ensure that the f-number was suitable for the lens array to collect enough light for quantum-limited operation (e.g., 10's of photons per pixel per frame at 30 fps fluoroscopy).

One limiting factor for how close the lenses can be to the CsI screen is the falloff in illumination between the center and the corners of the image. This falloff is caused by variations in the solid angle subtended by the lens from a point on the screen, and variations in the light intensity distribution, as that point moves radially outwards from the axial location on the screen.

Specifying values for lens m and f-number defines the relative illumination as a function of the lens focal length. If object distance $L_1$ is large compared to the lens radius, the illumination is approximately proportional to $(\cos \beta)^4$, in which $\beta$ is the angle between the lens axis and the ray from the object point to the center of the entrance of the lens. There is an inverse square contribution of $(\cos \beta)^2$, a $\cos \beta$ term from the foreshortening of the entrance plane as viewed from the object point, and a $\cos \beta$ term from the Lambertian distribution. This assumes that all the light from any screen pixel collected by the lens ends up on the corresponding image pixel.

Mathematical verification of the concepts in this application have shown that the actual illumination value is always greater than $(\cos \beta)^4$, so that $(\cos \beta)^4$ forms a lower bound. Then the expression is evaluated for the actual location on the screen which would be imaged onto the corners of a 14.4 mm diagonal CCD sensor, as a function of focal length, assuming a magnification of m=0.25, using the relationships between m, f and $L_1$ given above. As verified mathematically, for $F_{num}>0.5$, the falloff does not depend very strongly on f-number value, and $(\cos \beta)^4$ is a good approximation. For example, for a focal length f of 25 mm or greater, the center-to-corner falloff in illumination is less than 10%, which can be easily corrected.

As should be appreciated, the exact specifications of the lenses and system geometry (e.g., lengths $L_1$ and $L_2$) will depend on the various interrelated factors described above. As such, these specifications and characteristics can vary across a certain range, as has been shown by the example above. Performance can be determined in specific instances on a case-by-case basis, as described, to verify the quantum-limited aspect.

As should be appreciated, the present invention can be implemented to produce images having different shapes (square, rectangular, round) and/or aspect ratios (square; 3:4).

Although the present invention has been illustrated as using Marconi L3Vision™ sensors, it should be appreciated that other sensors capable of detecting low numbers of light photons, e.g., 1–10 light photons per CCD pixel, could be used instead without departing from the spirit and scope of the invention.

Since certain changes may be made in the above-described quantum limited low noise x-ray detector for fluoroscopy, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. An x-ray detector for fluoroscopy comprising:
   a. a screen configured to convert x-rays into photons;
   b. an array of image sensors positioned behind the screen and having at least one output for connection to a computer or other electronic imaging processor, each of said image sensors comprising a plurality of photosensor pixels; and
   c. a demagnification lens system positioned between the screen and the array of image sensors and configured to transfer photons emitted by the screen to the array of image sensors, said lens system comprising an array of individual lenses; wherein:
      i. the lens system is quantum limited in operation and able to transfer very low levels of photons from the screen to each photosensor pixel;
      ii. each image sensor is configured to detect low levels of photons; and
      iii. wherein the lens system is configured to transfer from the screen to the array of image sensors at least ten photons per photosensor pixel per frame at 30 frames-per-second fluoroscopy.

2. The x-ray detector for fluoroscopy of claim 1 wherein the photosensor pixels of each image sensor are non-avalanche multiplication photodiodes.

3. The x-ray detector for fluoroscopy of claim 1 wherein the lens system has an optimized demagnification ratio for providing quantum-limited operation.

4. The x-ray detector for fluoroscopy of claim 1 wherein there are an equal number of individual lenses and image sensors, and wherein the number of individual lenses is selected from the group consisting of: four lenses in a 2×2 array; nine lenses in a 3×3 array, and sixteen lenses in a 4×4 array.

5. The x-ray detector for fluoroscopy of claim 1 wherein the array of image sensors is enclosed in a thermally-insulated, gas-sealed enclosure that is cooled by a heat removal system.

6. A quantum-limited x-ray detector for fluoroscopy comprising:
   a. a screen configured to convert x-rays into photons;
   b. a demagnification lens system positioned behind the screen; and
   c. an array of CCD image sensors optically coupled to the screen by the lens system, said array of image sensors having at least one output for connection to a computer or other electronic imaging processor, and each of said image sensors comprising a plurality of non-avalanche multiplication photosensor pixels; wherein:
   d. the lens system is quantum limited in operation for transferring from the screen to the array of image sensors at least ten photons per photosensor pixel per frame for 30 frames-per-second fluoroscopy; and
   e. each CCD image sensor has an onboard CCD gain section, positioned before an output stage, that acts as a charge amplifier for boosting signal levels and reducing noise.

7. The quantum-limited x-ray detector of claim 6 wherein the gain section of each CCD image sensor comprises an extended gain register having a plurality of stages controllably clocked to produce a slight and well-controlled avalanche charge multiplication process, and, thereby, a slight gain per stage.

8. The quantum-limited x-ray detector for fluoroscopy of claim 7 wherein the array of CCD image sensors is enclosed in a thermally-insulated, gas-sealed enclosure that is cooled by a heat removal system.

9. The quantum-limited x-ray detector for fluoroscopy of claim 6 wherein the array of CCD image sensors is enclosed in a thermally-insulated, gas-sealed enclosure that is cooled by a heat removal system.

10. A quantum-limited x-ray imager for fluoroscopy comprising:
   a. an x-ray conversion screen for converting at least a portion of the x-rays received at an input side of the screen to photons at an output side of the screen; and
   b. a plurality of image sensors optically coupled to the photon output side of the screen by a lens system, wherein: each image sensor comprises a plurality of non-avalanche multiplication image sensor pixels; the lens system has an optimized demagnification ratio for quantum-limited operation and is configured to provide to the image sensor pixels a minimum light signal of at least one photon per x-ray conversion in the screen per frame for 30 frames-per-second fluoroscopy; and the images sensors have an on-board, low-noise electrical gain or amplification mechanism for detecting the minimum light signal.

11. The quantum-limited x-ray imager for fluoroscopy of claim 10 wherein the array of image sensors is enclosed in a thermally-insulated, gas-sealed enclosure that is cooled by a heat removal system.

12. The quantum-limited x-ray imager for fluoroscopy of claim 10 wherein: the image sensors are CCD image sensors; and the electrical gain or amplification mechanism of each CCD image sensor comprises an extended gain register having a plurality of stages controllably clocked to produce a slight and well-controlled avalanche charge multiplication process, and, thereby, a slight gain per stage, which, when multiplied by the number of gain register stages, produces an amplified detection signal greater than the input noise level of an output stage of the CCD image sensor, even when the CCD image sensors receive only the minimum light signal.

* * * * *